(12) United States Patent  (10) Patent No.: US 6,205,896 B1
Levy  (45) Date of Patent: Mar. 27, 2001

(54) DIE ACCELERATOR

(75) Inventor: Roger Levy, Bloomfield Hills, MI (US)

(73) Assignee: Tishken Products Co., Detroit, MI (US)

( * ) Notice: Subject to any disclaimer, the term of this patent is extended or adjusted under 35 U.S.C. 154(b) by 0 days.

(21) Appl. No.: 09/408,199

(22) Filed: Sep. 29, 1999

(51) Int. Cl.$^7$ .............................. B21B 1/00; B23D 21/00; B23D 25/02
(52) U.S. Cl. .................................. 83/37; 83/294; 83/318; 83/320; 72/203
(58) Field of Search ............................... 83/13, 293, 294, 83/318, 319, 320, 37; 72/203

(56) References Cited

U.S. PATENT DOCUMENTS

| | | | |
|---|---|---|---|
| 3,129,624 | * | 4/1964 | Aver ........................................ 83/320 |
| 3,272,045 | * | 9/1966 | Cookson ................................. 83/320 |
| 3,704,643 | * | 12/1972 | Cookson ................................. 83/294 |
| 3,803,966 | * | 4/1974 | Plegat ..................................... 83/294 |
| 3,805,654 | * | 4/1974 | Plegat ..................................... 83/319 |
| 4,407,179 | * | 10/1983 | Iwase et al. ............................ 83/294 |
| 5,816,127 | * | 10/1998 | Ouchi et al. ............................ 72/203 |

\* cited by examiner

*Primary Examiner*—W. Donald Bray
(74) *Attorney, Agent, or Firm*—Dykema Gossett PLLC

(57) ABSTRACT

A hydraulic press is provided with a fixed base and at least one rail. The hydraulic press is slidably disposed on the rail. A die is slidably mounted on the hydraulic press for operatively engaging a moving coil of material upon activation of the hydraulic press. A clamp is fixably connected with the die and is slidably mounted on the hydraulic press. The clamp has a pneumatically powered anvil which secures itself to the moving coil of material to cause the clamp and the die to move along with the moving coil of material. A first stop is disposed between the press and the die for providing engagement there between to stop relative movement between the die and the hydraulic press. An accelerator displaces the hydraulic press with respect to the base to move along with the moving coil of material. The clamp holds the material while the die engages the moving coil of material to ensure tension in the moving coil of material. Powered outlet rollers pull the work piece away from the press and thereby ensure tension between themselves and the hydraulic press when the die engages the moving coil of material.

16 Claims, 5 Drawing Sheets

DIE ACCELERATOR

FIELD OF THE PRESENT INVENTION

The field of the present invention is that of hydraulic presses used in conjunction with roll forming machines and methods of the utilization thereof.

BACKGROUND OF THE INVENTION

In the prior art, hydraulic presses are used in conjunction with roll forming machines. The hydraulic press punches apertures into the work piece and/or cuts the work piece to length after the work piece has been formed by the roll forming machine. The hydraulic press includes a hydraulic drive which forces a first surface downward towards a two-part die. The die upper half is forced downwardly into the work piece by the hydraulic press first surface. The hydraulic press and die both move with the work piece. The die and press move independently of each other along a work path. The die is initially engaged with the moving work piece, and is moved by the moving work piece. Once the die is moving, it engages the press. The work piece then moves both the press and the die. The hydraulic press is then actuated to apply the downward force after it begins moving with the die. Since the die is already moving when it contacts the press, the inertia which must be overcome to begin the press to move is relatively low. Moreover, the momentum from the moving die assists in overcoming the inertia of the press. If the work piece is held in tension when the die engages the work piece, the performance of the die puncture or cutting operation is enhanced. It would be desirable to provide a hydraulic press which can hold a moving work piece in tension when it is acted upon by the die. It is also desirable to provide a hydraulic press and method of utilization thereof which can hold both sides of the work piece in tension when the die engages the work piece.

SUMMARY OF THE INVENTION

To meet the above noted desires, the revelation of the present invention is brought forth. In a preferred embodiment the present invention provides a machine having a fixed base with at least one rail. A hydraulic press having guides is slidably disposed on the rail of the fixed base. A counter is provided for determining the length of moving material which is passed to the hydraulic press. A die is slidably mounted on the hydraulic press for operatively engaging the moving coil of material upon activation of the hydraulic press. Fixably connected with the die is a clamp which is also slidably mounted on the hydraulic press. The clamp secures the moving coil of material when the die engages the moving coil of material and keeps it in tension during the die engagement. A first stop is disposed between the hydraulic press and the die for providing engagement there between to stop relative movement between the die and the press when the die is moved by the moving coil of material. An accelerator is actuated by a signal provided by the counter. The accelerator moves the hydraulic press along with the moving coil of material. A second stop limits the position of the clamp with respect to the hydraulic press. Take off rollers are provided for removing the moving coil of material from the press after the press is actuated.

It is an object of the present invention to provide a hydraulic press which can engage a set of dies with a moving coil of material.

It is another object of the present invention to provide a hydraulic press with a clamp that will clamp onto the material and hold the material in tension when the material is being engaged by the die.

It is a further object of the present invention to provide a hydraulic press with take off rollers which retain the work piece in tension at an outlet in the hydraulic press when the die engages the work piece.

The above noted and other objects of the present invention will become more apparent to those skilled in the art as the invention is further explained in the accompanying drawings and detailed description.

DETAILED DESCRIPTION OF THE PREFERRED EMBODIMENT

Figure 1:
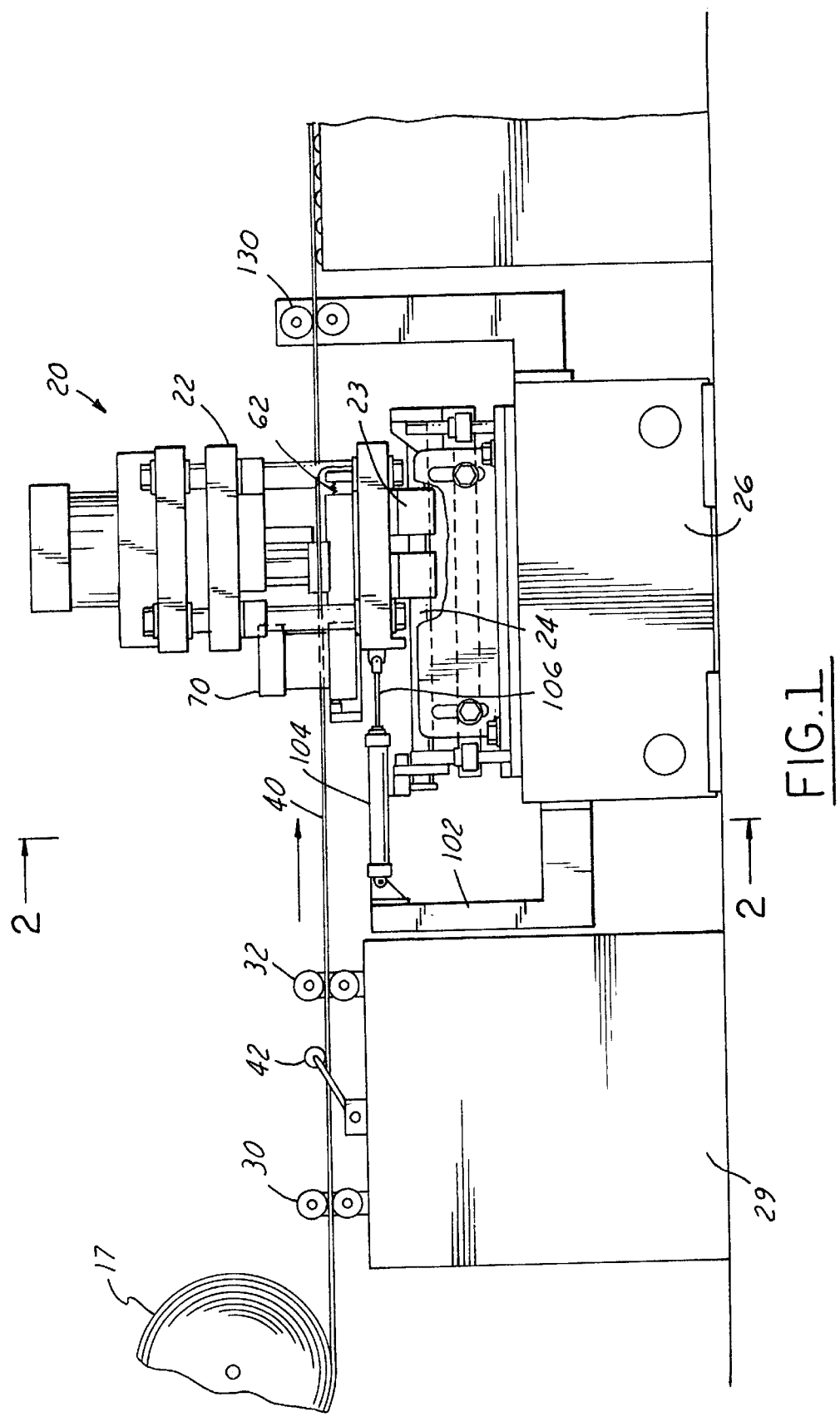
FIG. 1 is a largely schematic side view of a portion of the present invention.
Figure 2:
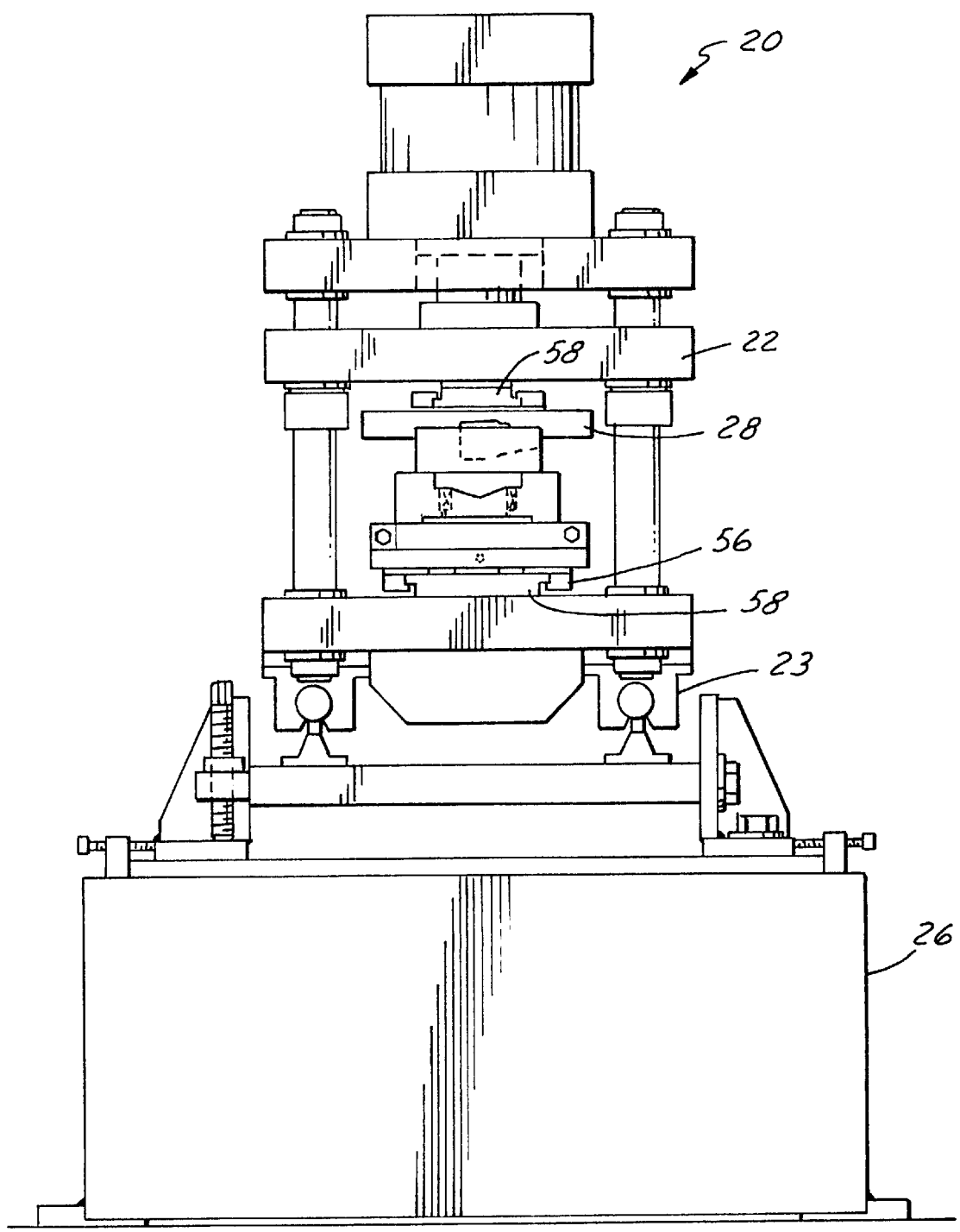
FIG. 2 is an end view of an embodiment of the present invention.

FIGS. 1 and 2 illustrate a hydraulic press 20 including an upper press portion 22 and guides 23 which are slidably mounted along parallel spaced rails 24. Rails 24 are associated with a fixed base 26. Base 26 may be incorporated into a roll forming machine 29.

Roll forming machine 29 has a first pair of forming rollers 30 and a second pair of forming rollers 32. Although only two pairs of rollers 30 and 32 are shown in FIG. 1, in practice the roll forming machine 29 can have a greater number of rollers to progressively form a moving coil of material 40 into a desired rolled form. Roll forming machine 29 also has an electronic counter or measuring wheel 42. Electronic measuring wheel 42 has a wheel with a predefined circumference. An electronic standard encoder is utilized to count the angular rotation of measuring wheel 42 to determine the linear length of moving coil of material which has passed to hydraulic press 20. When a predetermined linear distance of coil material 40 has passed through, measuring wheel 42 will send an appropriate signal.

Figure 4:
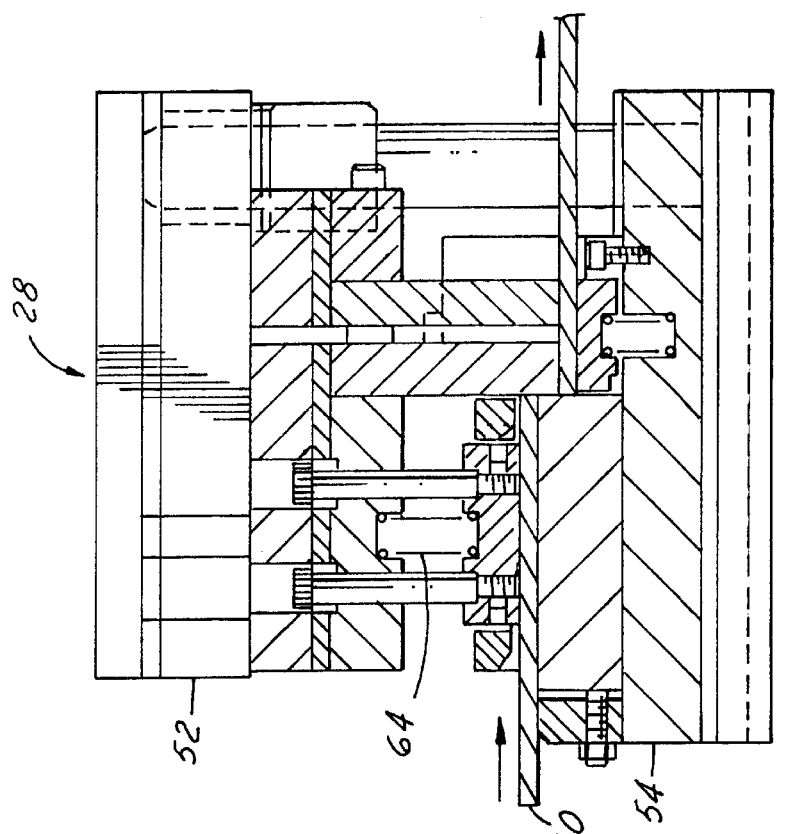
FIG. 4 is a side view of one portion of the present invention illustrated in FIG. 1.
Figure 3:
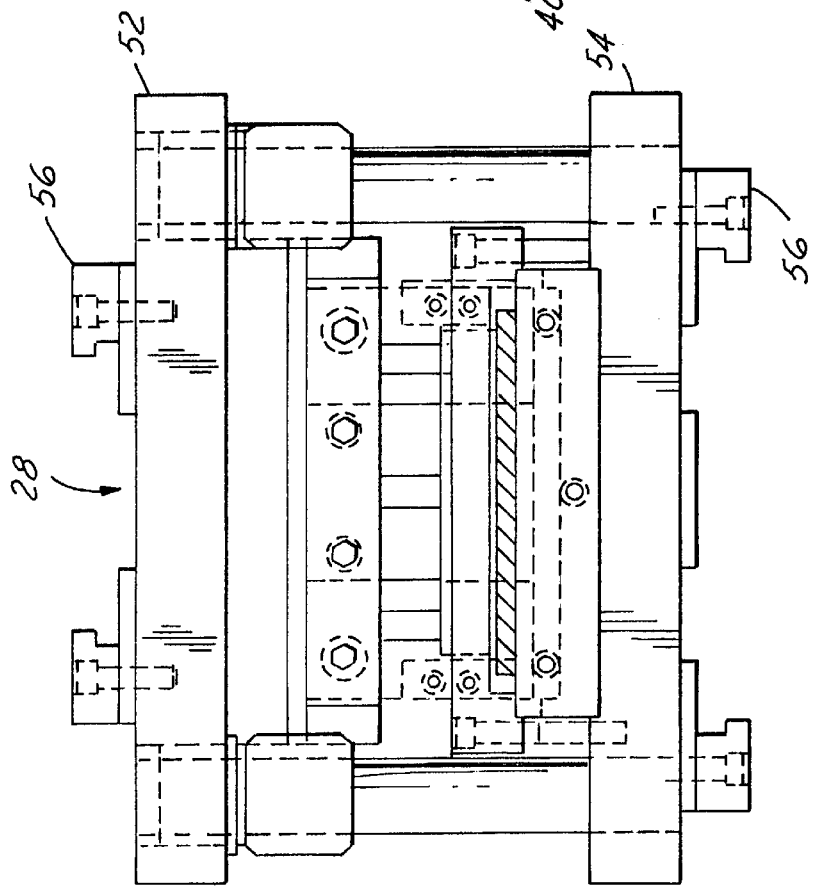
FIG. 3 is an end view of one portion of the present invention.

Referring additionally to FIGS. 3 and 4, a die 28 has upper and lower halves 52, 54. The die halves 52, 54 each have fixably connected thereto blocks 56 which are slidably mounted on rails 58. Rails 58 are fixably connected with the hydraulic press 20. A spring 62 (FIGS. 1, 7) is mounted between hydraulic press 20 and die 28. As shown, return spring or springs 64 bias the two die halves 52, 54 toward relatively-spaced positions. Hydraulic press 20 is selectively actuated to bring die halves 52, 54 toward each other, and engage the work piece of the moving coil of material 40.

Figure 6:
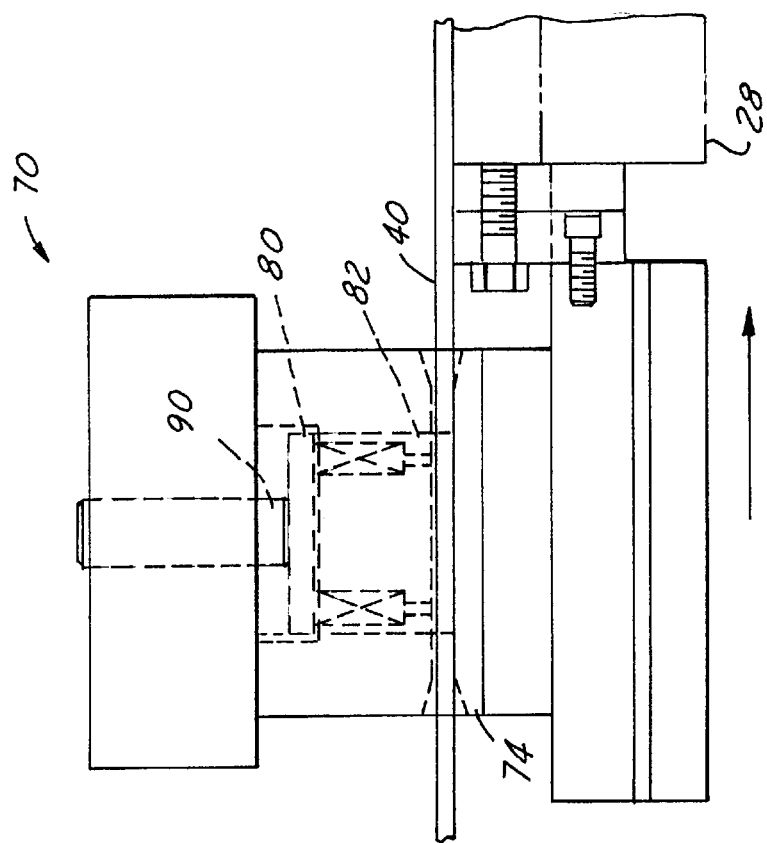
FIG. 6 is a side view of one portion of the present invention illustrated in FIG. 1.
Figure 5:
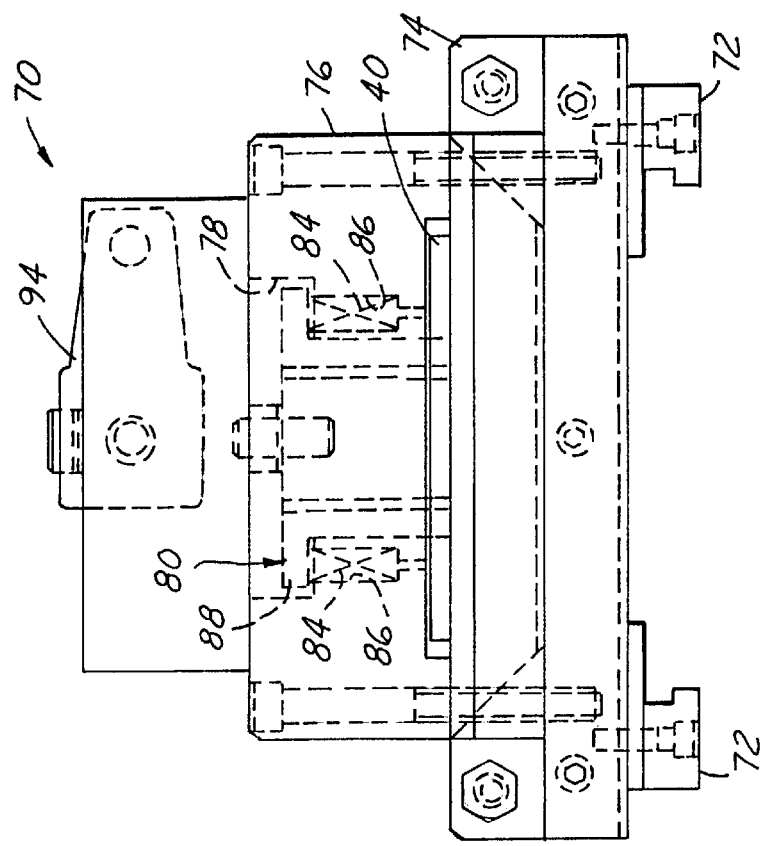
FIG. 5 is an end view of one portion of the present invention.

FIGS. 5 and 6 illustrate a pneumatic device or cylinder 70 which has fixably attached to its bottom, blocks 72. The blocks 72 are slidably mounted on rail 58 of hydraulic press 20. Device 70 has a lower support structure 74 and an upper support structure 76. Upper support structure 76 has a multi-diameter interior bore 78. Fitted within bore 78 is an anvil or clamp 80. Clamp 80 is spring-biased to an upper position by springs 84 which are captured within blind bores 86. Springs 84 push upward against wings 88 of anvil or clamp 80. Clamp 80 is selectively pushed downward by activation of cylinder 70 having an extendable rod 90. A normally closed pneumatic valve 94 controls the retraction or extension of rod 90. Extension of rod 90 causes it to push down clamp 80 to clamp moving coil work piece 40. Pneumatic device 70 at one end is contacting and fixably connected with die 28 and moves therewith as shown in FIG. 6.

Figure 7:
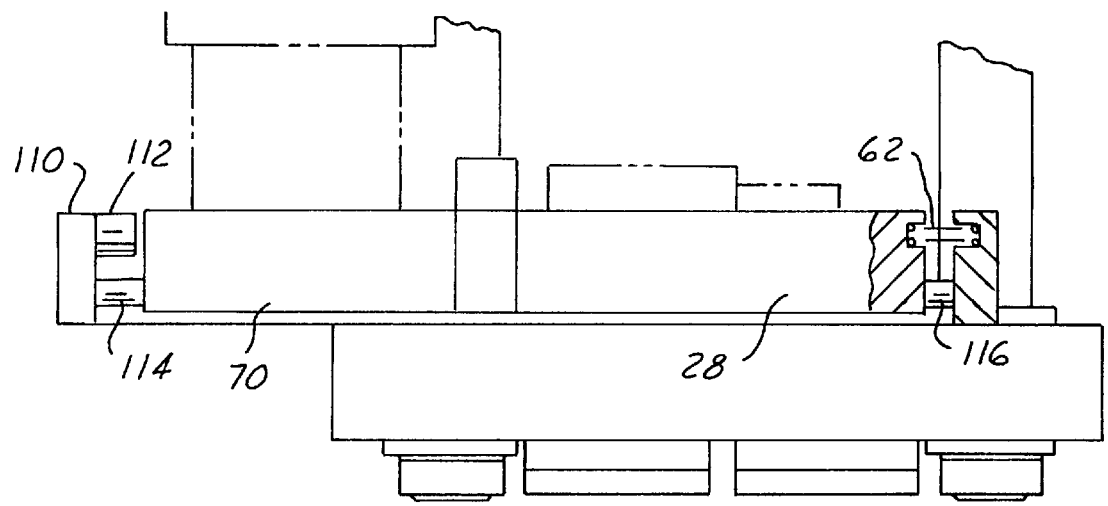
FIG. 7 is an enlarged side view of a portion of the present invention illustrated in FIG. 1.

Referring back to FIG. 1, base 26 has fixably connected thereto an arm 102. Arm 102 has pivotally connected thereto a hydraulic press accelerator 104. Accelerator 104 is a pneumatic cylinder having an extendable rod 106 which is pivotally connected with hydraulic press 20. An extreme end of rail 24 has a vertical extension 110 having an elastomeric bumper 112 and a stop 114 (FIG. 7). Stop 114 limits relative travel of clamp 70 with respect to hydraulic press 20. A stop 116 limits travel of die 28 with respect to hydraulic press 20.

Figure 8:
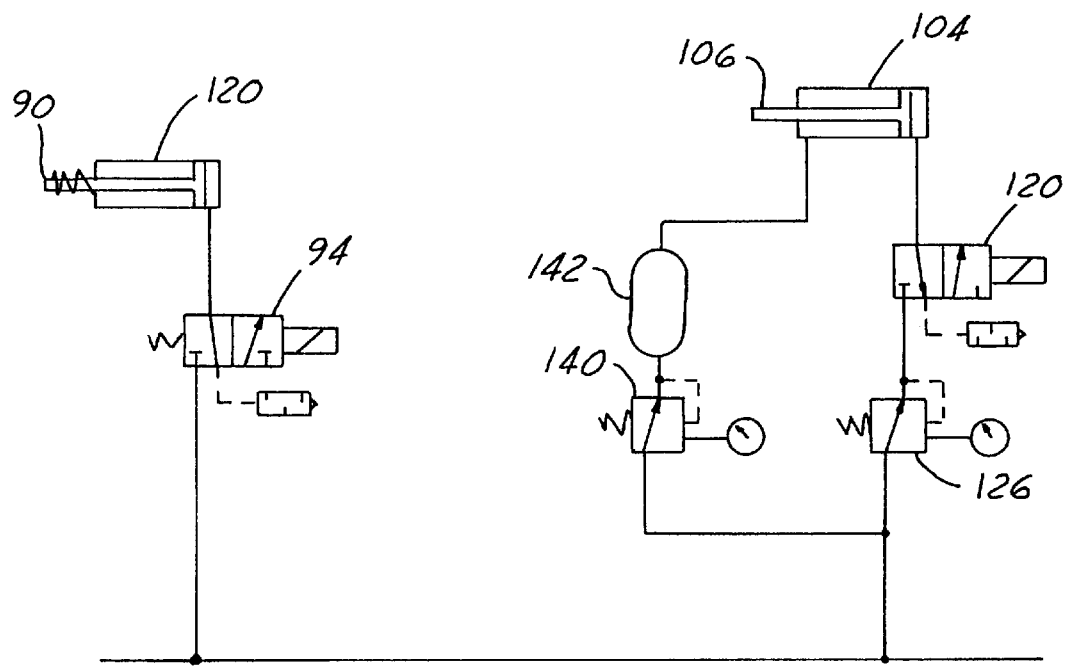
FIG. 8 is a hydraulic control schematic of the present invention as shown in FIG. 1.

The operation of the invention follows. The moving work piece 40 is presented to roll forming machine 29 from a coil 17. The work piece 40 is shaped by forming rollers 30, 32. The linear length of work piece 40 is determined by the counter wheel 42. Upon counter wheel 42 determination that an appropriate length of work piece has been presented to hydraulic press 20, a signal will be generated. Upon actuation of the signal, solenoid actuated valve 94 (as shown in FIG. 8) is actuated, causing cylinder 120 to be pressurized and thereby extend cylinder rod 90 for clamp 80. Clamp 80 and die 28 now move (leftward as shown in FIG. 1) with the moving coil of material (work piece 40). Upon the actuation of valve 94, an accelerator control valve 120 will be actuated to cause accelerator cylinder 104 to be connected with a high pressure regulation valve 126. The high pressure passing through high pressure regulation valve 126 pressurizes hydraulic cylinder 104 to extend piston rod 106. Extension of piston rod 106 causes hydraulic press 20 to move along with work piece 40. Clamp 80 with die 28 continue to move leftward until die 28 engages stop 116. Upon engagement with stop 116, die hydraulic press 20 will be actuated to bring die 28 into engagement with work piece 40 and to sever it as shown in FIG. 4. A high quality cut is made upon the moving work piece 40 since work piece 40 is held in tension by clamp 80 during actuation of the die 28. Additionally work piece 40 is held in tension by clamp 80 due to the acceleration of the hydraulic press. On the reverse (or outlet) side of hydraulic press 20, work piece 40 is held in tension by powered exit rollers 130 which pull work piece 40 out of die 28. The holding of work piece 40 in tension helps to prevent uneven working upon work piece 40 due to a lack of tension during the engagement of die 28. A low pressure regulation valve 140 which is connected to an accumulator 142 provides a large volume source of low pressure to return the hydraulic press 20 to the rest position after die 28 has severed work piece 40 and valve 120 has returned to its normal condition.

The speed of the clamp 80 that engages work piece 40 is 0.2 seconds cycle time. The speed on the press 20 when moved by the accelerator is 150 feet per minute. The amount of tension of the coil material when acted upon by the dies varies with different stock thickness.

Although a preferred embodiment of this invention has been disclosed, it should be understood that a worker of ordinary skill in the art would recognize certain modifications which come within the scope of this invention. For that reason, the following claims should be studied in order to determine the true scope and content of this invention.

I claim:

1. A machine comprising:
    a fixed base having at least one rail;
    a hydraulic press having guides slidably disposed on said rail of said fixed base;
    a die slidably mounted on said hydraulic press for operatively engaging a moving coil of material upon activation of said press;
    a clamp slidably mounted with respect to said hydraulic press for securing the moving coil of material when said die engages the moving coil of material, said clamp being contacted with said die when securing the moving coil of material; and
    a first stop disposed between said press and said die for providing engagement therebetween to stop relative motion between said die and said press when said die is moved with the moving coil of material, the moving coil of material thereby overcoming the inertia of said press and said die.

2. A machine as described in claim 1 further including blocks connected to said die, said blocks being slidably mounted on a rail of said hydraulic press.

3. A machine as described in claim 1, further including a second stop to limit the position of said clamp with respect to said hydraulic press.

4. A machine as described in claim 1 wherein said clamp is fixably connected with said die.

5. A machine as described in claim 4 wherein said clamp is pneumatically actuated for securing the moving coil of material.

6. A machine as described in claim 1 further including an accelerator to move said hydraulic press along with the moving coil of material.

7. A machine as described in claim 6 wherein said accelerator is provided by a pneumatic cylinder.

8. A machine as described in claim 6 wherein said clamp is fixably connected with said die.

9. A machine as described in claim 1 further including a counter to measure the moving coil of material and to provide a signal to selectively actuate said clamp when the moving coil of material reaches a predetermined length.

10. A machine as described in claim 1 further including exit rollers for pulling the moving coil of material from said hydraulic press after said hydraulic press has been actuated and said die has engaged the moving coil of material.

11. A machine comprising:
    a fixed base having at least one rail;
    a hydraulic press having guides slidably disposed on said rail of said fixed base;
    a counter for determining a length of moving coil material which has passed to said machine;
    a die slidably mounted on said hydraulic press for operatively engaging the moving coil of material upon activation of said hydraulic press;
    a clamp fixably connected with said die and slidably mounted on said hydraulic press for securing the moving coil of material when said die engages the material
    a first stop disposed between said press and said die for providing engagement therebetween to stop relative movement between said die and said press when said die is moved with the moving coil of material;
    an accelerator for displacing said hydraulic press with respect to said base to move said hydraulic press along with the moving coil of material;

a second stop limiting the position of said clamp with respect to said hydraulic press; and take-off rolls for removing the moving coil of material from said press after said press has actuated said die.

12. A machine as described in claim 11 wherein a pneumatic cylinder is utilized as said accelerator and said counter provides a signal that controls actuation of said clamp.

13. A method of engaging and cutting a moving coil of material into lengths comprising the steps of:

slidably mounting a hydraulic press on a base;

slidably mounting a die on the hydraulic press;

connecting the die to a clamp which is slidably mounted with respect to the hydraulic press;

clamping the moving coil of material with the clamp to cause the clamp and die to move with the coil of material under tension;

accelerating the hydraulic press to move the hydraulic press along with the moving coil of material under tension; and actuating the hydraulic press to cause the die to engage and to cut the moving coil of material into a length.

14. The method as described in claim 13 further including the steps of counting a length of the moving coil of material passing to the hydraulic press and actuating the clamp in response to a predetermined length of the moving coil of material passing to the hydraulic press.

15. The method as described in claim 14 further including the step of pulling the moving coil of material out of the hydraulic press with exit rollers.

16. A method of cutting a moving coil of material into predetermined lengths comprising the steps of:

slidably mounting a hydraulic press on a base;

slidably mounting on said hydraulic press a die;

connecting with said die a clamp slidably mounted with respect to said hydraulic press;

counting a predetermined length of material of the coil of material passing to said hydraulic press and providing a signal upon said a predetermined length of the coil of material;

clamping the moving coil of material with said clamp to cause said clamp and said die to move with the moving coil of material;

accelerating said hydraulic press to move said hydraulic press along with the moving coil of material;

actuating said press causing said die to cut the moving coil of material into a length; and pulling the length of moving coil of material away from said hydraulic press with exit rollers.

* * * * *